United States Patent [19]

Pelly

[11] Patent Number: 5,045,768

[45] Date of Patent: Sep. 3, 1991

[54] OFF-LINE BATTERY CHARGER

[75] Inventor: Brian R. Pelly, Palos Verdes Estates, Calif.

[73] Assignee: International Rectifier Corporation, El Segundo, Calif.

[21] Appl. No.: 428,163

[22] Filed: Oct. 27, 1989

[51] Int. Cl.⁵ ............................................. H02J 7/00
[52] U.S. Cl. ...................................... 320/2; 320/31; 320/39; 320/57; 363/126
[58] Field of Search .............. 320/2, 57, 31, 32, 39; 363/126; 361/56

[56] References Cited

U.S. PATENT DOCUMENTS

| | | | |
|---|---|---|---|
| 3,708,738 | 1/1973 | Crawford | 361/56 X |
| 4,152,635 | 5/1979 | Scott, Jr. | 320/32 X |
| 4,342,955 | 8/1982 | Gant | 320/32 X |
| 4,412,278 | 10/1983 | Cambier | 363/126 |

Primary Examiner—R. J. Hickey
Attorney, Agent, or Firm—Ostrolenk, Faber, Gerb & Soffen

[57] ABSTRACT

A universal battery charger circuit has polarized capacitors disposed in the input a-c lines to a bridge-connected rectifier. A voltage clamping circuit is connected to the d-c terminals of the bridge and diodes are connected in parallel with each of the polarized capacitors to define a circuit for the flow of charging current. Regulation circuits are provided for both battery voltage and charging current so that any battery of given voltage output can be charged from different input voltage sources.

13 Claims, 4 Drawing Sheets

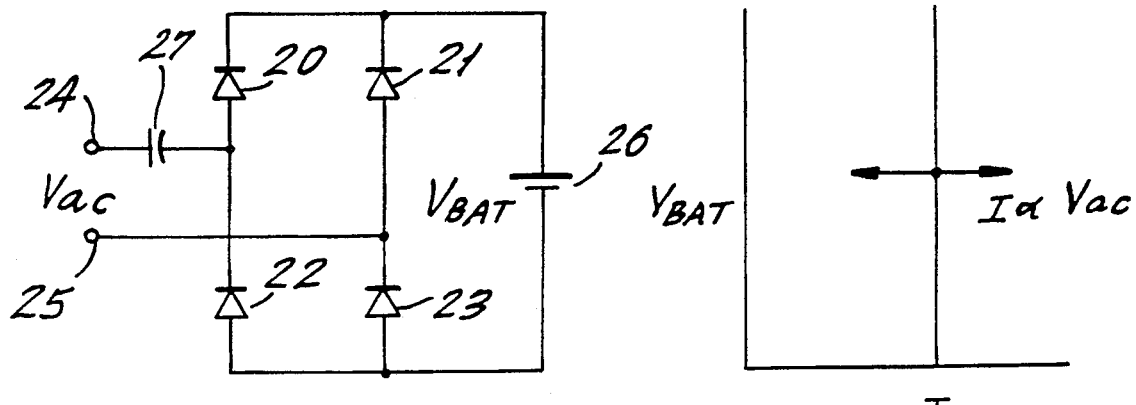
FIG. 1
PRIOR ART
FIG. 2.
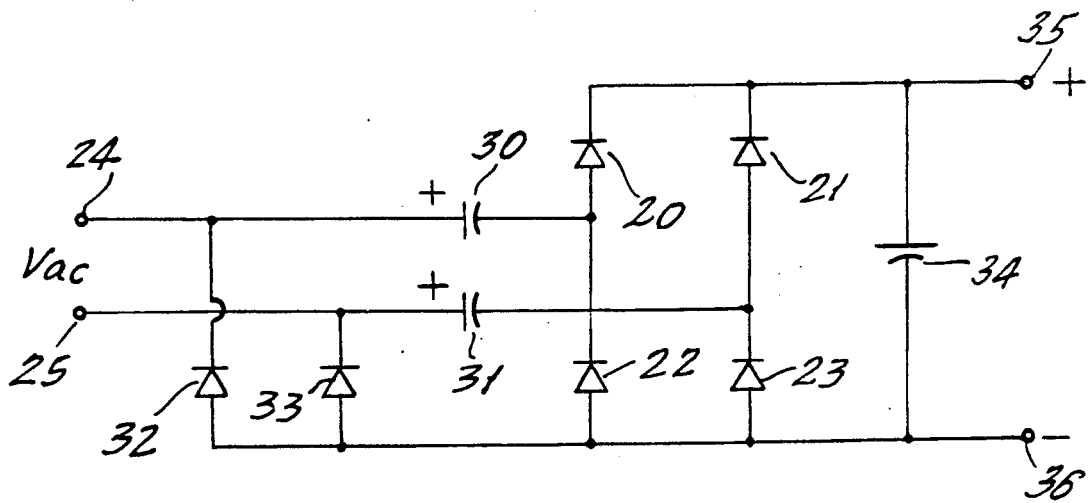
FIG. 3.
PRIOR ART

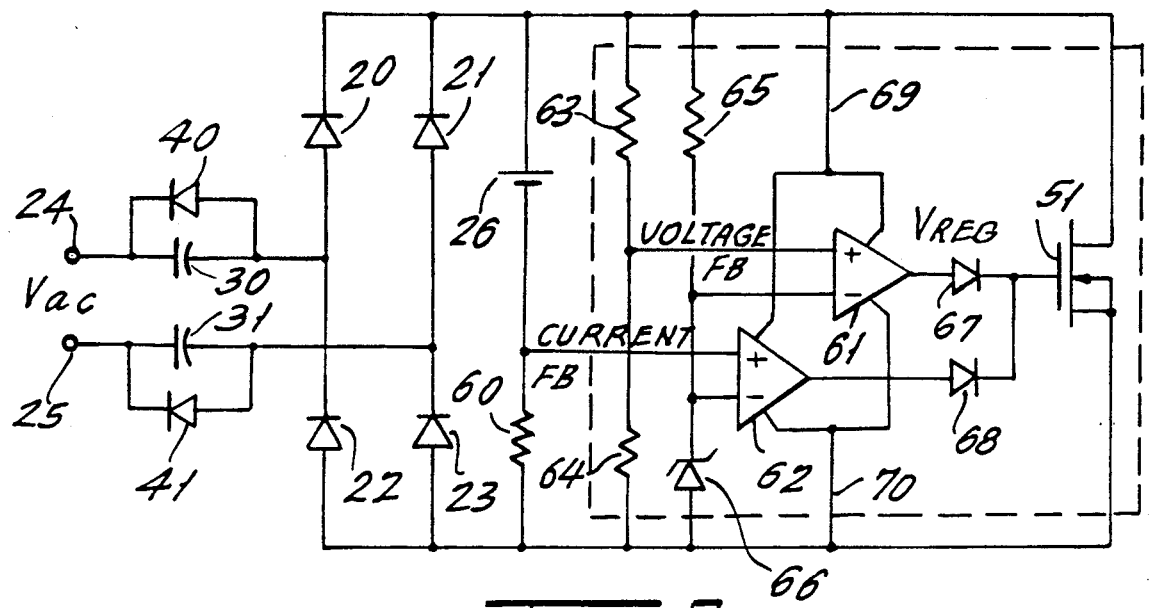
FIG. 7
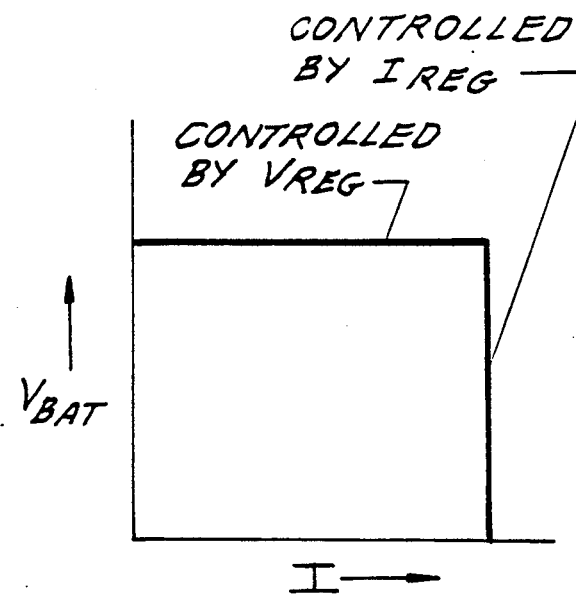
FIG. 8
FIG. 9

OFF-LINE BATTERY CHARGER

BACKGROUND OF THE INVENTION

This invention relates to a novel battery charger, and more specifically relates to a novel small and inexpensive off-line charger employing polarized isolation capacitors for isolating the a-c source from the d-c output side of the device, with respective bypass diodes for each of the polarized capacitors and means for controlling the output d-c voltage and the battery charging current.

Small power supplies, for example, those commonly housed in an a-c plug-in adaptor for a small low power d-c appliance are well known. Such devices commonly have a two-winding transformer for providing low voltage and isolation between the a-c and d-c sides of the circuit and a bridge-connected rectifier and filter for producing a low voltage d-c output. Such devices can be used to operate small d-c appliances or to charge batteries or the like.

In order to reduce the size and cost of such power supplies, a-c capacitors and d-c coupling capacitors have been employed in place of a two-winding transformer. It is known, for example, from U.S. Pat. No. 4,412,278, dated Oct. 25, 1983 that the capacitors can be polarized d-c capacitors to provide a current-determining function. In these prior art circuits, the output d-c current is proportional to the input a-c voltage. Thus, if the system is used for different a-c input voltages, for example, 120 or 240 volts a-c, the output d-c current is different accordingly. Therefore, such a circuit cannot be used as a "universal" battery charger to charge a battery of given current capacity. Furthermore, in such prior art systems, the battery charging current is generally proportional to the input a-c voltage regardless of the battery voltage or its state of charge. This condition can cause damage to some batteries so, for this further reason, systems of this type cannot be universal battery chargers

BRIEF DESCRIPTION OF THE INVENTION

In accordance with the present invention, polarized capacitors are connected in each of the two a-c lines leading to the a-c terminals of a full wave bridge-connected rectifier. Respective bypass diodes are connected directly in parallel with each of the polarized capacitors to provide a return path in parallel with the capacitors.

A voltage clamp which may be a zener diode, or a combined zener diode and MOSFET, or a MOSFET controlled by an appropriate integrated circuit which is responsive to battery voltage and battery current, is then used to at least clamp the battery voltage and preferably to control charging current. The circuit can then be used as a universal charger operated from a variable a-c input voltage. A current regulation circuit can also be added to provide a controlled by-pass for charging current so that the battery to be charged can be of any type, further expanding the universality of the charger.

The control circuits for controlling the MOSFET in the universal charger embodiment can have most of its components integrated into a single chip with a control MOSFET.

Other features and advantages of the present invention will become apparent from the following description of the invention which refers to the accompanying drawings.

BRIEF DESCRIPTION OF THE DRAWINGS

FIG. 1 is a circuit diagram of a prior art off-line non-isolated battery charger with an a-c capacitor for setting charging current.

FIG. 2 is a diagram illustrating charging current as a function of battery voltage for the circuit of FIG. 1.

FIG. 3 is a circuit diagram of a prior art d-c supply circuit employing polarized capacitors for isolation purposes.

FIG. 7 is a circuit diagram of a third embodiment of the invention in which both battery voltage and charging current are controlled.

FIG. 8 is a diagram illustrating charging current as a function of battery voltage for the circuit of FIG. 7.

FIG. 9 illustrates the manner in which the control characteristic of the circuit of FIG. 7 can be modified.

DETAILED DESCRIPTION OF THE DRAWINGS

Figure 4:
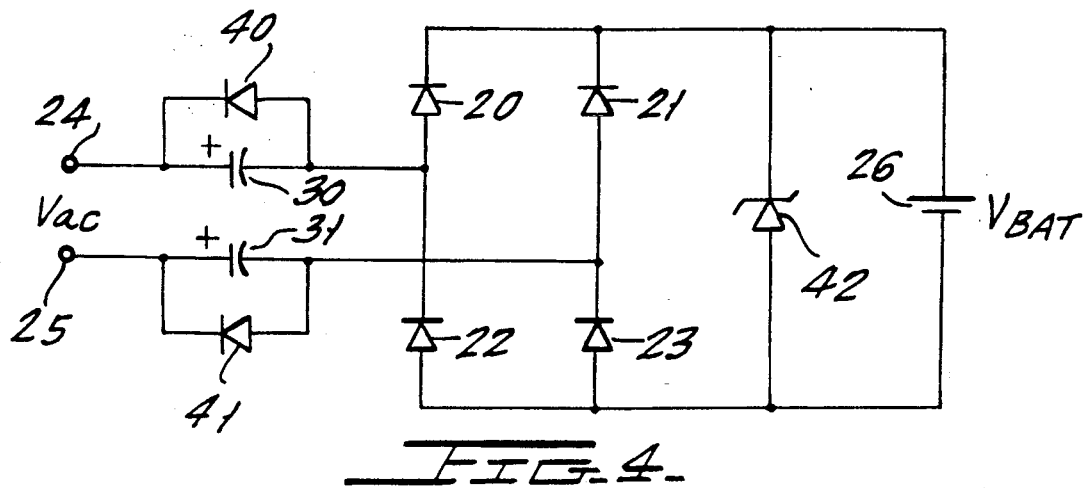
FIG. 4 is a circuit diagram of a first embodiment of the invention.

Referring first to FIG. 1, a prior art circuit is shown which uses a single phase, full wave bridge-connected rectifier consisting of diodes 20, 21, 22 and 23. Any other well-known rectifier, either single phase or multiphase, can be used. The a-c terminals of the bridge are connected to a source voltage VAC at terminals 24 and 25. The d-c terminals of the bridge are connected to a battery 26 which is to be charged. Battery 26 typically can be a 12 volt battery. The input voltage applied to terminals 24 and 25 may typically be 120 volts a-c or 240 volts a-c. An a-c capacitor 27 is provided for setting the current for the circuit.

As shown in FIG. 2, the charging current for battery 26 of FIG. 1 will be constant regardless of its voltage or state of charge. Furthermore, the charging current will be a function of line voltage. Therefore, the same battery charging circuit of FIG. 1 cannot be used for both 120 volt and 240 volt supplies. Therefore, the circuit is not a universal type of battery charging circuit. Moreover, the a-c capacitor 27 is fairly large so that the volume of the circuit is similarly large.

It is known that power supplies can be isolated by the use of d-c polarized capacitors in place of the a-c capacitor 27 of FIG. 1. Such d-c capacitors are much smaller than a-c capacitor 27. Thus, in the circuit of FIG. 3 in which components corresponding to those of FIG. 1 have similar identifying numerals, smaller d-c polarized capacitors 30 and 31 are provided between terminals 24 and 25 and respective a-c input terminals of the bridge. Current return diodes 32 and 33 are also provided as shown extending from the negative terminal of the bridge to the two a-c lines. The output terminals of the circuit are connected across an output capacitor 34 and to d-c terminals 35 and 36.

In FIG. 3, capacitors 30 and 31 act as current-determining elements and are of relatively small size. However, the output voltage and charging current depend on the input a-c voltage as shown in FIG. 2 so that, again, the circuit of FIG. 3 is not a universal circuit.

FIG. 4 shows a first embodiment of the novel battery charging circuit of the invention where components similar to those of FIGS. 1 and 3 have similar identifying numerals In the circuit of FIG. 4, bypass diodes 40 and 41 are connected directly across capacitors 30 and 31, respectively, and a zener diode 42 is connected to clamp the maximum output voltage which can be applied to the battery 26.

It will be noted in FIG. 4 that capacitors 30 and 31 have anodes marked with a plus sign. The diodes 40 and 41 have their cathode terminals connected to the anode terminals of capacitors 30 and 31 and have their anode terminals connected to the cathode terminals of capacitors 30 and 31, respectively. Notwithstanding the terminology used herein, diodes 40 and 41 bias the capacitors 30 and 31 so that they receive essentially only one polarity of voltage while passing a-c current between the a-c source and the rectifier circuit.

Zener diode 42 will have a clamping voltage chosen to be the voltage for the battery 26. Thus, it is now possible to prevent overcharging of the battery from the continuous flow of charging current from the d-c terminals of the bridge containing diodes 20 through 23. Relatively little power will be dissipated in the zener diode 42 where, for example, if the zener voltage is 14 volts in order to clamp the output to the battery 26 to 14 volts as for a typical automotive battery, a current of about 100 milliamperes in the zener 42 will produce only about 1.4 watts. Consequently, the entire circuit will have very small components which can be carried on a common heat sink type support and can be easily contained within a very small housing. While the assembly can have any application, it can be contained within an a-c outlet plug for a d-c appliance.

Figure 6:
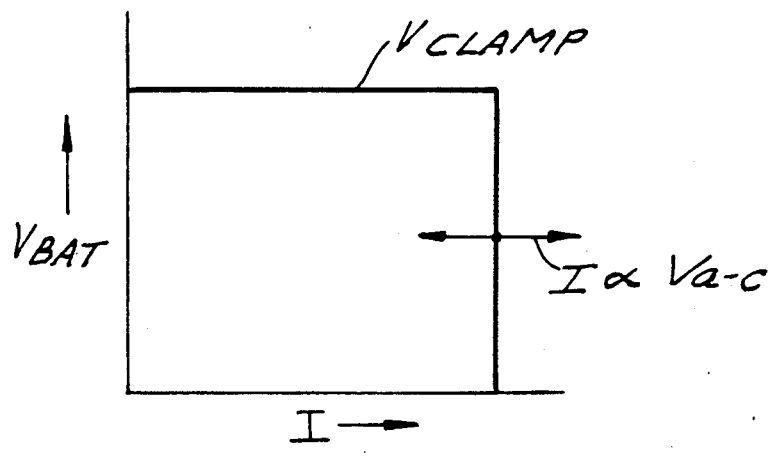
FIG. 6 is a diagram illustrating charging current as a function of battery voltage for the embodiments of FIGS. 4 and 5.

The characteristic battery voltage charging current for the circuit of FIG. 4 is shown in FIG. 6 which is self-explanatory. Note that the voltage V CLAMP of FIG. 6 is the reverse breakdown voltage of zener diode 42. Note further that the current output of the bridge is proportional to the a-c input voltage VAC as was the case of FIGS. 1 and 3.

Figure 5:
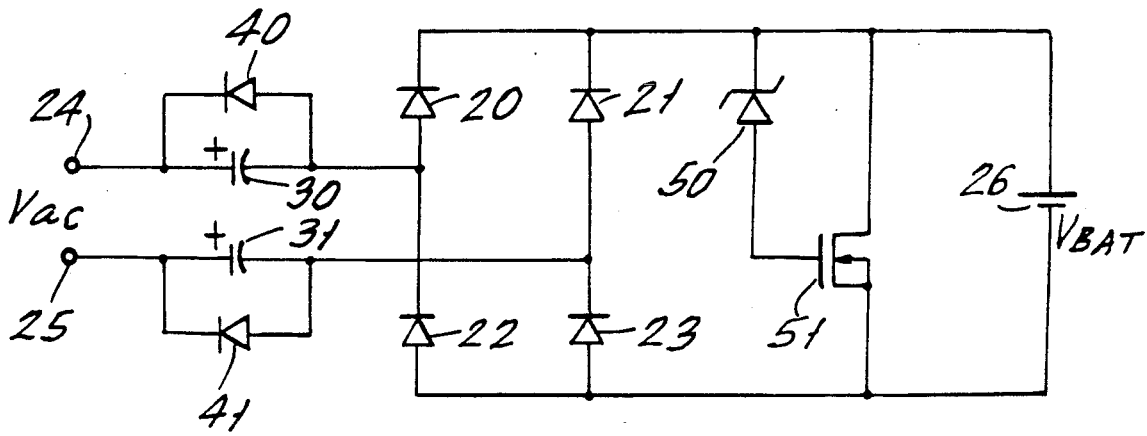
FIG. 5 is a circuit diagram of a second embodiment of the invention.

FIG. 5 shows a modification in the clamping circuitry for the circuit of FIG. 4 in which the zener diode 42 is replaced by a combination of zener diode 50 and MOSFET 51. In the circuit of FIG. 5, MOSFET 51 will turn on when the set voltage for zener diode 50, for example, 12 volts is reached. This type arrangement will provide a more level voltage clamp but the output current of the bridge is still proportional to line voltage.

FIG. 7 shows a further embodiment of the invention wherein both output voltage and charging current can be controlled, with the battery current controlled independently of line voltage. Thus, the circuit of FIG. 7 is useful as a universal charger as to voltage and battery type as well, and will have improved voltage regulation characteristics.

The circuit of FIG. 7 employs the same numerals for components similar to those of FIGS. 4 and 5. It differs from FIGS. 4 and 5 in the control circuitry. Thus, in FIG. 7, a small current measuring resistor 60 is connected in series with battery 26. Two operational amplifiers 61 (for voltage regulation) and 62 (for current regulation) are provided. A resistor divider consisting of resistors 63 and 64 provides a feedback voltage input to operational amplifier 61 while a connection from the node between battery 26 and resistor 60 provides a feedback current input to the operational amplifier 62.

A reference voltage is produced at the node between series-connected resistor 65 and zener diode 66. This reference voltage is connected to the reference terminal of each of operational amplifiers 61 and 62. The outputs of operational amplifiers 61 and 62 are connected through diodes 67 and 68, respectively, to the gate of MOSFET 51.

A source of biasing voltage for each of operational amplifiers 61 and 62 is connected over lines 69 and 70, respectively, which are connected to the d-c output terminals of the bridge.

In operation, when the output voltage across battery 26, as measured by the voltage divider circuit 63-64, exceeds the reference voltage of zener 66, operational amplifier 61 produces an output through diode 67 to turn on MOSFET 51 accordingly.

MOSFET 51 then turns on, to the extent necessary to shunt current away from the battery 26 and keep its voltage from rising above the set value. If the MOSFET 51 momentarily turns on too much, the battery voltage will fall below the set value, and the output of amplifier 61 will fall, applying less drive to MOSFET 51 and correcting the situation.

As a result, it is possible to control the output voltage as is shown in FIG. 8 by virtue of the circuit including operational amplifier 61.

Charging current is controlled through the function of operational amplifier 62. Thus, as the current measured in current-sensing resistor 60 varies from a reference value determined by the voltage of zener 62, the current regulator operational amplifier 62 drives MOSFET 51 in such a manner as to bypass more or less of the charging current. Thus, the charging current, through the battery 26, can be set independently of the input voltage VAC as shown in FIG. 8. Therefore, the battery current can be controlled independently of line voltage and the circuit can, therefore, be used as a universal charger with relatively tight voltage regulation.

It should be further noted that the control characteristics for controlling the output voltage across battery 26 and the charging current can be controlled according to any desired shape such as that shown in FIG. 9 by simply appropriately adjusting and controlling the various components of the control circuit of FIG. 7.

Where desired, other control characteristics or protective features can be integrated into the circuit shown in FIG. 7.

The circuit of FIG. 7 can be made up of discrete parts or, if desired, all of the components 61 through 68 can be integrated into a single IC along with MOSFET 51.

Figure 10:
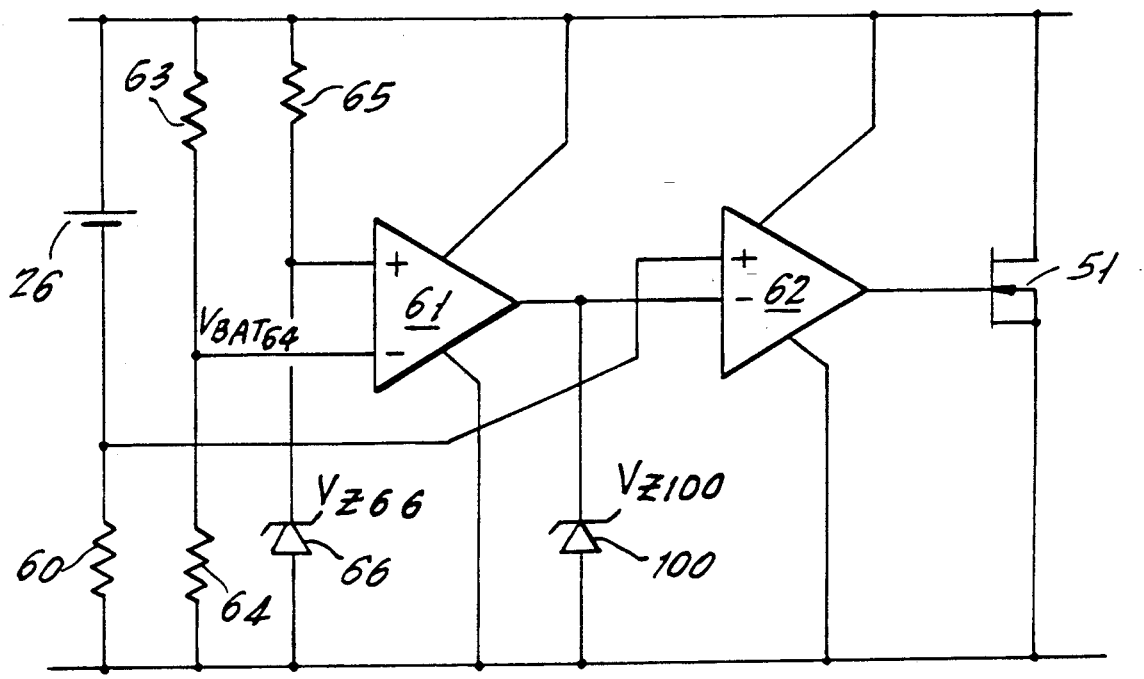
FIG. 10 is a further embodiment of the invention and is a modification of the circuit of FIG. 7.

FIG. 10 shows a modification of the circuit of FIG. 7 in which components similar to those of FIG. 7 have the same identifying numerals. It will be seen that a zener diode 100 is added to the circuit and operational amplifiers 61 and 62 are differently connected. The modified circuit will be more stable and will require less gain for the voltage regulator.

In operation of the circuit of FIG. 10, when the voltage at the node between resistors 63 and 64 is less than the voltage on zener diode 66, the output of amplifier 61 is clamped at the voltage of zener diode 100 and operational amplifier 62 operates as in FIG. 7. However, when the voltage at the node between resistors 63 and 64 becomes equal to or greater than the voltage on zener diode 66, the output of amplifier 61 moves below the voltage of zener diode 100 and reduces the current regulator current reference. MOSFET 51 then turns on more, shunting more current away from the battery being charged, and keeping battery voltage to the value set by the voltage of zener diode 66.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A battery charger circuit comprising, in combination: an a-c to d-c converter circuit having a pair of a-c input terminals and a pair of d-c terminals; a pair of input terminals for connection to an a-c source; first, and second polarized d-c capacitors having anode and cathode terminals connected between respective ones of said pairs of input terminals and a-c terminals; first and second diodes having anode and cathode terminals; said anodes of said first and second diodes connected to said cathodes of said first and second capacitors respectively; said cathodes of said first and second diodes connected to said anodes of said first and second capacitors, respectively; said first and second diodes comprising bypass diodes for biasing said first and second polarized d-c capacitors respectively; and voltage clamp circuit means connected to said d-c terminals to clamp the output voltage which can be applied to a battery connected to said d-c terminals.

2. The circuit of claim 1 wherein said a-c to d-c converter circuit comprises a single phase, full wave bridge-connected rectifier.

3. The circuit of claim 1 wherein said clamp circuit comprises a zener diode.

4. The circuit of claim 1 wherein said clamp circuit comprises a MOSFET having main terminals connected to said d-c terminals, respectively, and a zener diode connected between one of said main terminals and the gate electrode of said MOSFET.

5. The circuit of claim 3 wherein said a-c to d-c converter circuit comprises a single phase, full wave bridge-connected rectifier.

6. The circuit of claim 4 wherein said a-c to d-c converter circuit comprises a single phase, full wave bridge-connected rectifier.

7. A battery charger circuit comprising, in combination: an a-c to d-c converter circuit having a pair of a-c input terminals and a pair of d-c terminals; a pair of input terminals for connection to an a-c source; first and second polarized d-c capacitors having anode and cathode terminals connected between respective ones of said pairs of input terminals and a-c terminals; first and second diodes having anode and cathode terminals; said anodes of said first and second diodes connected to said cathodes of said first and second capacitors respectively; said cathodes of said first and second diodes connected to said anodes of said first and second capacitors, respectively; voltage clamp circuit means connected to said d-c terminals to clamp the output voltage which can be applied to a battery connected to said d-c terminals; a MOSFET having its main terminals connected to said d-c terminals; a voltage regulation circuit means defining said clamp circuit; and a current regulation circuit means and output circuit means coupling said voltage and current regulation circuit means to the gate of said MOSFET for controlling the output voltage across said d-c terminals and the charging current through a battery connected across said d-c terminals.

8. The circuit of claim 7 wherein said first and second diodes comprise bypass diodes for biasing said first and second polarized d-c capacitors respectively.

9. The circuit of claim 7 wherein said current and voltage regulator means have respective feedback circuits for monitoring battery voltage and charging current in a battery connected across said d-c terminals.

10. The circuit of claim 9 wherein said current and voltage regulator means comprise respective operational amplifiers.

11. The circuit of claim 10 wherein said MOSFET, operational amplifiers and output circuit means are integrated into a common integrated circuit.

12. The circuit of claim 7 wherein said a-c to d-c converter circuit comprises a single phase, full wave bridge-connected rectifier.

13. The circuit of claim 11 wherein said a-c to d-c converter circuit comprises a single phase, full wave bridge-connected rectifier.

* * * * *